United States Patent
Bohnert et al.

(10) Patent No.: US 6,628,869 B2
(45) Date of Patent: Sep. 30, 2003

(54) METHOD FOR PRODUCING A FIBEROPTIC WAVEGUIDE

(75) Inventors: Klaus Bohnert, Oberrohrdorf (CH); Hubert Brändle, Oberengstringen (CH); Philippe Gabus, Baden (CH)

(73) Assignee: ABB Research Ltd, Zurich (CH)

( * ) Notice: Subject to any disclaimer, the term of this patent is extended or adjusted under 35 U.S.C. 154(b) by 20 days.

(21) Appl. No.: 09/725,800

(22) Filed: Nov. 30, 2000

(65) Prior Publication Data

US 2001/0002944 A1 Jun. 7, 2001

(30) Foreign Application Priority Data

Dec. 6, 1999 (DE) .......................... 199 58 600

(51) Int. Cl.⁷ ................................. G02B 6/02
(52) U.S. Cl. ................. 385/123; 385/95; 385/96; 385/97; 385/98; 385/99
(58) Field of Search .............................. 385/123, 95–97

(56) References Cited

U.S. PATENT DOCUMENTS 4,548,631 A    10/1985   Arditty et al.
4,603,941 A    8/1986    Fujii et al.

FOREIGN PATENT DOCUMENTS

EP    0856737 A1    8/1998
JP    5-297238 A    11/1993

*Primary Examiner*—Robert H. Kim
*Assistant Examiner*—George Wang
(74) *Attorney, Agent, or Firm*—Burns, Doane, Swecker & Mathis, L.L.P.

(57) ABSTRACT

A method is described for producing a fiberoptic waveguide with a basic segment (11) and a phase shift segment (12), the basic segment (11) and phase shift segment (12) having fiber cores (K) of the same form and the fiber cores being aligned at a defined angle ($\alpha$) to one another. In the method, use is made of an optical fiber (1) having a fiber core (K) of the abovenamed form, which fiber is twisted at least approximately by the abovenamed defined angle ($\alpha$) and held fixed in this torsional position. Subsequently, a stress-relief zone (13) is heated inside the twisted fiber (1) until the torsion is released inside the stress-relief zone (13) and the basic segment (11) is produced on one side of the stress-relief zone (13) and the phase shift segment (12) is produced on the other side. In this case, the fixing of the torsional position is maintained until after solidification of the stress-relief zone (13).

11 Claims, 2 Drawing Sheets

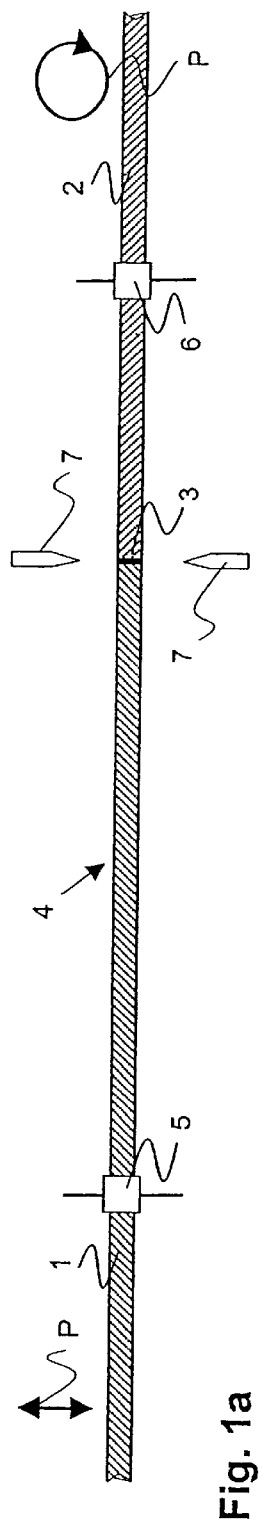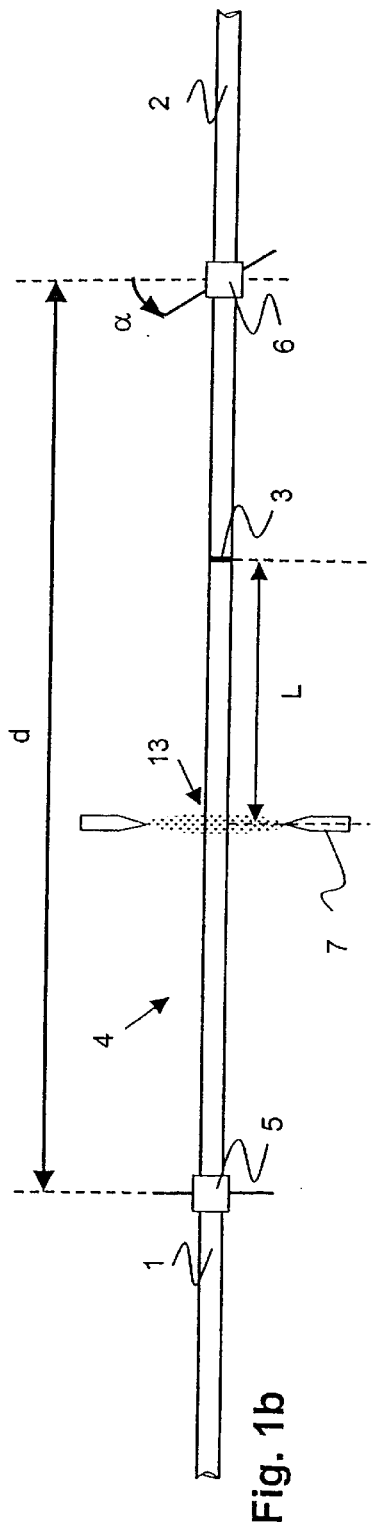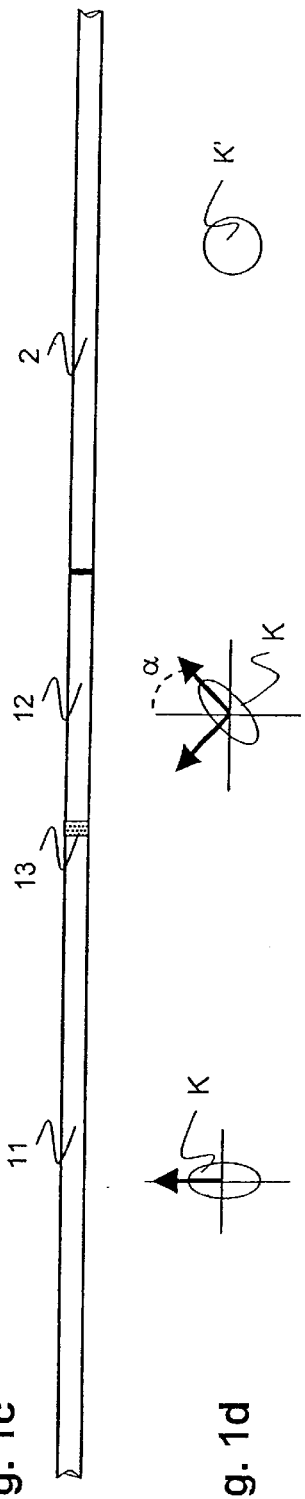
Fig. 1a  Fig. 1b  Fig. 1c  Fig. 1d

METHOD FOR PRODUCING A FIBEROPTIC WAVEGUIDE

This application claims priority under 35 U.S.C. §§119 and/or 365 to Appln. No. 199 58 600.4 filed in Germany on Dec. 6, 1999; the entire content of which is hereby incorporated by reference.

DESCRIPTION

1. Technical field

The invention relates to a method for producing a fiberoptic waveguide, and to a fiberoptic waveguide having a basic segment and a phase shift segment in accordance with the preamble of patent claims 1 and 10.

2. Prior art

A fiberoptic waveguide of the generic type and having a basic segment and a phase shift segment is disclosed, for example, in EP-A-0,856,737, where it is used in a magnetooptic current sensor. This waveguide has two polarization-maintaining basic fibers with elliptical cores, said fibers being called the feeder fiber and return fiber, and a sensor fiber which has a round core, is arranged between these two fibers, and is wound in the form of a coil around an electric conductor. Present as transitional elements between the basic fibers and sensor fiber is one phase shift element each in the form of a fiberoptical $\lambda/4$ time-delay element whose likewise elliptical core is rotated by 45° with respect to the core of the basic fibers. Linearly polarized waves which propagate in the feeder fiber are decomposed upon transition into the time-delay element into two orthogonal polarization components which are aligned parallel to the main axes of the core of the time-delay element. The length of the $\lambda/4$ time-delay element is selected in this case such that the two polarization components at its end have an optical phase difference of 90° because of the birefringence. The light emerging from the time-delay element is then circularly polarized. Consequently, it is possible to use a first time-delay element to generate from linearly polarized waves of the feeder fiber circularly polarized waves which can propagate in the sensor fiber and are converted back again by a second time-delay element into linearly polarized waves whose polarization is parallel to a main axis of the elliptical core of the return fiber, such that they can propagate in the latter.

The production of such a fiberoptic waveguide requires some skill. In accordance with the prior art, the first step for this purpose is to align the elliptical cores of the basic fiber and of the time-delay element with an orientation of 45° relative to one another. The alignment is performed by means of polarizers and is very time consuming as a rule. Thereafter, one fiber end each of the basic fiber and of the time-delay element are connected to one another, this being performed as a rule by means of arc welding, also known as splicing.

It is true that splicers are known which automatically determine the angular orientation of fiber cores by lateral transirradiation of the fibers. This method delivers good results for fibers with stress-induced birefringence. However, it is inadequate for the above-described fibers, whose birefringence is based on an elliptical core. This applies, in particular, in the case of fibers which are designed for small wavelengths of at most 850 nm, since the elliptical fiber cores are very small and the splicer cannot detect their orientation with sufficient accuracy.

SUMMARY OF THE INVENTION

It is therefore an object of the invention to create a method for producing a fiberoptic waveguide of the type mentioned at the beginning, as well as a waveguide, which method and waveguide permit simple production even for fibers with elliptical cores.

This object is achieved by a method having the features of patent claim 1, and by a waveguide having the features of patent claim 10.

In the method according to the invention, an optical fiber is twisted by a defined angle and a zone of the fiber is heated until the torsion in this zone is released so as to produce adjacent to this zone a basic segment on one side and, on the other side, a phase shift segment or a segment with an alignment corresponding to the phase shift segment to be achieved.

A complicated alignment of two fibers is superfluous, since it is replaced by a simple torsion about an optical axis or longitudinal axis of a fiber. The torsion is released by local heating of the fiber material. There is produced inside the fiber a stress-relief zone which subdivides the fiber into two segments whose fiber cores are aligned relative to one another by the torsion angle.

It is possible thereby to create a fiberoptic waveguide which has in a single-piece optical fiber both a basic segment and a phase shift segment, the basic segment and phase shift segment having cores which are aligned relative to one another by a defined angle, and the two segments being separated from one another by the heated and re-solidified stress-relief zone. The cores of the basic segment and the shift segment have the same form, specifically that of the core of the optical fiber.

In a first variant of the method, the optical fiber is connected to a second optical fiber, both fibers being twisted with one another. The stress-relief zone is selected in this case such that it is situated at a defined distance from a joint of the two fibers.

In another variant of the method, only the optical fiber is twisted, the position of the stress-relief zone being selected arbitrarily. Only after solidification of this zone is the optical fiber broken at a defined distance therefrom in order to form a phase shift segment with the length it requires. Subsequently, a second fiber, in particular having a different core, can be spliced to this break.

It is advantageous that it is possible in the method according to the invention to achieve fine correction of the state of polarization and/or of the phase shift segment by setting the birefringence of the phase shift segment by heating.

Further advantageous embodiments follow from the dependent patent claims.

BRIEF DESCRIPTION OF THE DRAWINGS

The method according to the invention and the subject matter of the invention are explained in more detail below with the aid of preferred exemplary embodiments which are illustrated in the attached drawings, in which:

FIGS. 1a to 1c show a fiberoptic waveguide during its production in accordance with a first variant of the method according to the invention, FIG. 1d shows the fiber cores of the individual segments of the waveguide according to the invention in accordance with FIG. 1c, FIGS. 2a to 2c show a fiberoptic waveguide, produced in accordance with a second variant of the invention.

WAYS OF IMPLEMENTING THE INVENTION

Figure 2A:
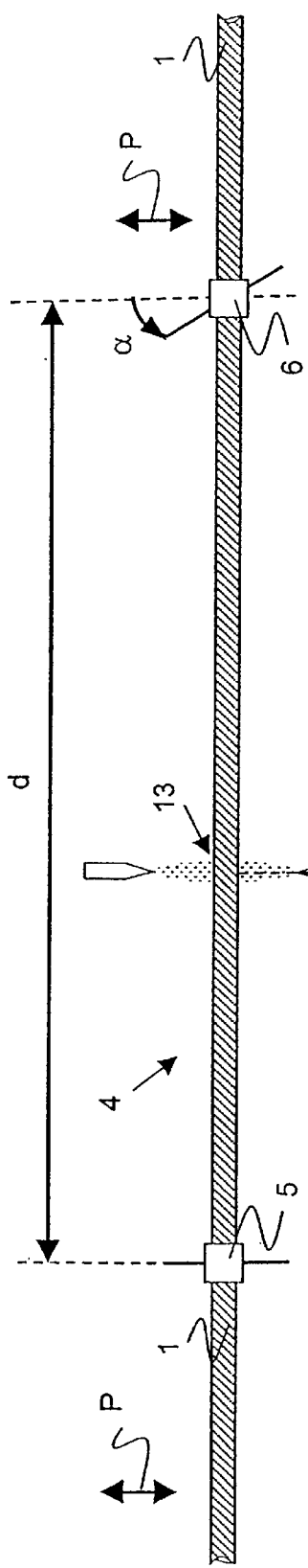
FIG. 2d shows the fiber cores of the waveguide in accordance with FIG. 2c.

The method according to the invention for producing a fiberoptic waveguide is explained below with the aid of FIGS. 1a to 1d.

Two fibers 1,2 are clamped in holders 5,6 of a fiber splicer. Except for two electrodes 7, the splicer is not further illustrated. In the example illustrated here, two fibers 1,2 with different cores are used, the first fiber 1 illustrated on the left in the illustration having an elliptical core K for propagating linearly polarized light waves, and the second fiber 2, illustrated on the right, having a round core K' for propagating circularly polarized light waves. The polarizations P are illustrated in FIG. 1a by arrows. The cores K,K' are to be seen in FIG 1d. If the fiber serves for use in a magnetooptic sensor of the type named at the beginning, the first fiber 1 forms a basic fiber and the second fiber 2 a sensor fiber.

The two fibers 1,2 are joined to one another by means of the splicer in an electric arc so as to produce a joint 3. This operation requires only an axial alignment of the fibers, but no angular orientation of the axes of the core K. The result is a fiber assembly which has a section 4 clamped between two holders 5,6, the section 4 including the joint 3. The length d of the section 4 is typically 5–15 cm. This optical fiber assembly is illustrated in FIG. 1a.

In a subvariant of the method, a fiber assembly already previously assembled is clamped into the splicer or into another unit suitable for the further method.

At least one of the two holders 5,6 is designed as a rotary holder with the aid of which the clamped section 4 can be rotated about an optical axis or the longitudinal axis of the fiber assembly. In this example, this is the second holder 6, which encloses the second fiber 2. The section 4 or the fiber assembly is now twisted by at least approximately a predefined angle α and held fixed in this torsional position. If the fiber serves for use in a magnetooptic sensor of the type mentioned at the beginning, the angle α is at least approximately, preferably exactly 45°.

The clamped section 4 is now heated locally, preferably by means of the arc of the splicer. For this purpose, the holders 5,6 are moved with the clamped fiber by a defined distance in the longitudinal direction of the fiber assembly so that the electrodes 7 point to the first fiber 1, the basic fiber. The displacement distance or the distance L from the splice 3 depends on the type of the phase shift segment 12 to be achieved, since this distance forms the length of the resulting phase shift segment 12. In general, the length is at least a multiple of a fraction of a beat length of orthogonal polarization modes of the first fiber 1. If, as illustrated here, a λ/4 time-delay element is created, the distance 1 is at least approximately one quarter of the beat length, and for a λ/2 or λ/8 time-delay element it is half or an eighth thereof. In the case of a wavelength of 800 nm, the beat length is approximately 4 mm for commercially available fibers with an elliptic core. The length ratio of the two main axes of the elliptic core is 2:1 in this case. By selecting the distance L, it is therefore possible to obtain any desired state of polarization between linear and circular polarization.

The local heating leads to the formation of a stress-relief zone 13 inside the first fiber, whose length is approximately 10–90 μm. This stress-relief zone 13 is heated until the torsion in it is released. The fiber is preferably softened in the process, but not fused. Owing to the release of the torsion, the fiber rotates partially such that the fiber core on one side of the stress-relief zone 13 is rotated by the torsional angle α with respect to the fiber core of the other side. The stress-relief zone 13 is caused to solidify actively or passively, the fixing of the torsional position being maintained up to the solidification of the stress-relief zone 13. In the case of the materials usually employed, the zone solidifies on its own within a few seconds after the arc is extinguished.

This relative orientation remains permanent after the solidification of the stress-relief zone 13 and after the release of the holders 5,6. As may be seen in FIG. 1c, a fiberoptic waveguide is obtained which has a basic segment 11 to the left of the stress-relief zone 13, and a phase shift segment 12 to the right, both segments being formed from a single-piece optical fiber, specifically the first fiber 1. However, as illustrated in FIG. 1d, in this case they have cores K of the same form, but with different orientations.

The stress-relief zone 13 of this fiberoptic waveguide according to the invention has a core which is no longer exactly elliptical and therefore differs from the cores K of the basic segment 11 or phase shift segment 12. This is associated, inter alia, with the diffusion of the dopings of the core, as a rule germanium atoms, during heating of the stress-relief zone 13.

Figure 2B:
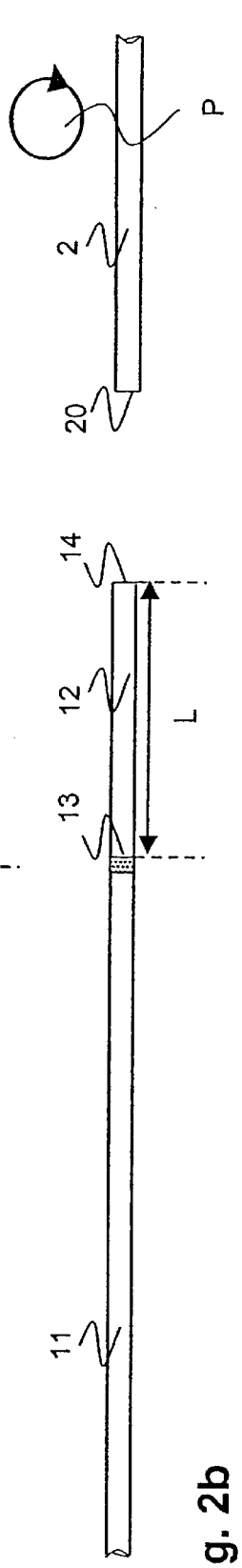
Figure 2C:
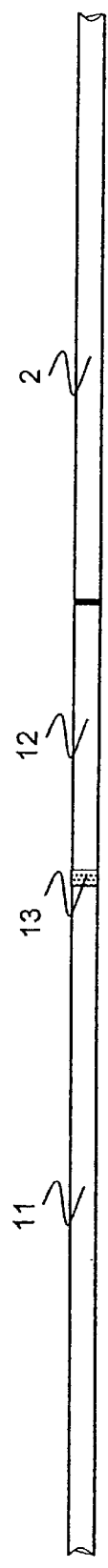
Figure 2D:
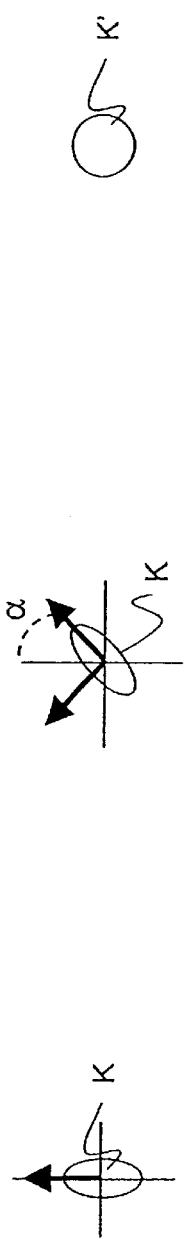

A second variant of the method according to the invention is illustrated in FIGS. 2a to 2c. In this variant, only the optical fiber 1 is clamped between two holders 5,6 of the splicer, rotated by the defined torsional angle α with respect to the fiber longitudinal axis, and subsequently heated at an arbitrary point of the clamped section 4 by means of the arc, thus producing, in turn, the stress-relief zone 13, in which the torsion is released, as is illustrated in FIG. 2a. Here, as well, segments with differently directed cores are produced to the right and left of the stress-relief zone 13. After solidification of the stress-relief zone 13, the holders 5,6 are released and the optical fiber 1 is broken at a point which is removed from the stress-relief zone 13 at a defined distance L, as may be seen from FIG. 2b. The distance corresponds, in turn, to the length L of the phase shift segment 12 to be achieved, and therefore depends, in turn, on the type thereof. Depending on the purpose to which the fiberoptical waveguide according to the invention thus produced is to be put, it is now possible to splice a second fiber 2 onto this broken end 14. In the example in accordance with FIG. 2c illustrated here, a sensor fiber 2 with a round core is spliced on, in turn, in order to produce a waveguide for a magnetooptic current sensor. The cores K,K' of the two fibers are illustrated in FIG. 2d.

The method according to the invention permits fine correction of the state of polarization, which may be used in all variants of the method. Because of tolerances in the optical fiber 1 and also in the splicer, it is possible for the phase shift between the two orthogonal polarization components of the phase shift segment 12 to deviate from the desired value. This means in the example with the λ/4 shift segment that the value is not 90°. In order to provide the possibility of correction, it is possible to select the length of the phase shift segment 12, and thus the distance L, to be somewhat longer than a theoretical desired value so that the resulting phase shift is likewise greater than 90°. The light at the output of the phase shift segment 12 is therefore slightly elliptically polarized. The birefringence of the phase shift segment 12 can now be lowered in small steps by specifically, if appropriately repeatedly heating the phase shift segment 12 until the state of polarization at the output of the segment is within the desired tolerance, that is to say is circular, in this case. The heating is preferably performed, in turn, in the arc of the splicer. The explanation of this process is as follows: upon heating, dopings diffuse from the elliptical fiber core into the fiber cladding. The jump in the refractive index between core and cladding becomes smaller or is smeared, and this leads to a reduced birefringence.

In the above methods, polarization-maintaining fibers with elliptical cores were used as basic fibers. However, the method according to the invention is not limited to such fibers; it is, for example, possible also to use fibers with stress-induced birefringence.

Again, it is not absolutely necessary to mount a second fiber on the phase shift segment. Depending on the type of use, it is also sensible to leave the end of the phase shift segment averted from the stress-relief zone free so that the wave subsequently propagates further in space or in another material.

What is claimed is:

1. A method for producing a fiberoptic waveguide with a basic segment and a fiberoptic phase shift segment, the basic segment and the phase shift segment having fiber cores of the same first form, the fiber cores being aligned at a defined angle to one another, and the phase shift segment being connected to a second fiber via a joint, the second fiber having a core of a second form, that second form being different from the first form, comprising the steps of:

using an optical fiber with a fiber core of the first form, twisting the optical fiber by at least approximately the above named defined angle and holding the optical fiber fixed in this torsional position;

heating a stress-relief zone inside the twisted optical fiber until the torsion is released inside the stress-relief zone; and maintaining the fixing of the torsional position until after solidification of the stress-relief zone, the stress relief zone separating the phase shift segment and the basic segment of the optical fiber.

2. The method as claimed in claim 1, wherein the second fiber is joined to the phase shift segment after the solidification.

3. The method as claimed in claim 1, wherein at least approximately a multiple of a fraction of a beat length of orthogonal polarization modes is selected as the length of the phase shift segment.

4. The method as claimed in claim 3, wherein the length of the phase shift segment is selected longer than a theoretical desired value of a multiple of a fraction of a beat length of orthogonal polarization modes.

5. The method as claimed in claim 1, wherein 45° is selected as the defined angle.

6. The method as claimed in claim 1, wherein the optical fiber is connected to the second fiber before the torsion, wherein both fibers are twisted jointly, and wherein the optical fiber is heated at a defined distance from the joint.

7. The method as claimed in claim 6, wherein a fiber with an elliptical core is used as the optical fiber, and a fiber with a round core is used as the second fiber.

8. The method as claimed in claim 1, wherein after solidification of the stress-relief zone the optical fiber is broken at a defined distance from the stress-relief zone.

9. The method as claimed in claim 8, wherein at this broken end the optical fiber is connected to an end of a second fiber.

10. A fiberoptic waveguide comprising a basic segment, a fiberoptic phase shift segment connected in a fashion adjoining the latter, and a second optical fiber, the basic segment and phase shift segment having fiber cores of the same first form, the fiber cores being aligned at a predetermined angle to one another, and the second optical fiber having a fiber core of a second form, which second form is different from the first form, wherein the phase shift segment and the basic segment are produced from a single-piece optical fiber and separated by a stress-relief zone of the single-piece optical fiber having a core of a form that is different from the first form, and wherein the second fiber is connected to that end of the phase shift segment, which is averted from the stress-relief zone.

11. The method of claim 1, wherein the phase shift segment and the basic segment of the optical fiber are adjacent to the stress relief zone.

* * * * *